(12) United States Patent
Horley et al.

(10) Patent No.: US 9,965,342 B2
(45) Date of Patent: May 8, 2018

(54) SYNCHRONIZATION IN DATA PROCESSING LAYERS

(75) Inventors: John Michael Horley, Cambridge (GB); Nebojsa Makljenovic, Cambridge (GB); Katherine Elizabeth Kneebone, Cambridge (GB); Michael John Williams, Cambridgeshire (GB); Ian William Spray, Cambridge (GB)

(73) Assignee: ARM Limited, Cambridge (GB)

( * ) Notice: Subject to any disclaimer, the term of this patent is extended or adjusted under 35 U.S.C. 154(b) by 1180 days.

(21) Appl. No.: 12/659,668

(22) Filed: Mar. 16, 2010

(65) Prior Publication Data

US 2011/0231691 A1  Sep. 22, 2011

(51) Int. Cl.
| | |
|---|---|
| *G06F 9/00* | (2006.01) |
| *G06F 9/54* | (2006.01) |
| *G06F 13/42* | (2006.01) |
| *G06F 11/36* | (2006.01) |

(52) U.S. Cl.
CPC .......... *G06F 9/545* (2013.01); *G06F 11/3636* (2013.01); *G06F 11/3656* (2013.01); *G06F 11/3632* (2013.01)

(58) Field of Classification Search
None
See application file for complete search history.

(56) References Cited

U.S. PATENT DOCUMENTS

| | | | | |
|---|---|---|---|---|
| 5,920,899 A | * | 7/1999 | Chu | G06F 5/08 711/169 |
| 6,049,882 A | * | 4/2000 | Paver | G06F 9/3871 712/E9.063 |
| 6,055,620 A | * | 4/2000 | Paver | G06F 9/30181 712/201 |
| 7,903,560 B2 | * | 3/2011 | Glass | H04L 7/00 370/235 |
| 7,934,031 B2 | * | 4/2011 | Lines | G06F 9/3869 326/38 |
| 8,332,867 B2 | * | 12/2012 | Gotz | H04J 3/0697 709/207 |
| 2007/0283133 A1 | * | 12/2007 | Williams et al. | 712/227 |
| 2008/0235538 A1 | * | 9/2008 | Horley et al. | 714/47 |
| 2009/0183034 A1 | * | 7/2009 | Houlihane et al. | 714/45 |
| 2009/0271553 A1 | * | 10/2009 | Gang | G06F 11/349 710/305 |
| 2010/0257510 A1 | * | 10/2010 | Horley et al. | 717/128 |
| 2011/0231691 A1 | * | 9/2011 | Horley et al. | 713/375 |

\* cited by examiner

*Primary Examiner* — Tanh Nguyen
(74) *Attorney, Agent, or Firm* — Nixon & Vanderhye P.C.

(57) ABSTRACT

A data processing apparatus is provided having a hierarchy of layers comprising at least two data processing layers, each data processing layer configured to receive data and to generate processed data for passing to a next lower layer in said hierarchy, according to a protocol specific to that data processing layer. Each data processing layer is configured intermittently to add synchronization information to its processed data, the synchronization information providing semantic information required to interpret the processed data. Each data processing layer is further configured to output its synchronization information in response to a synchronization request signal received from a lower layer in said hierarchy, and at least one data processing layer is configured, when outputting its synchronization information, to issue its synchronization request signal to a higher layer in the hierarchy.

17 Claims, 8 Drawing Sheets

SYNCHRONIZATION IN DATA PROCESSING LAYERS

BACKGROUND OF THE INVENTION

Field of the Invention

The present invention relates to a data processing apparatus comprising a hierarchy of layers, each layer configured to generate data according to a protocol specific to that layer for passing to a next layer. More particularly, this invention relates to the use of synchronization information between such layers.

Description of the Prior Art

In a data processing apparatus, it is known for there to be multiple layers arranged in a hierarchy, wherein at least some of those layers are configured to process data and to generate, according to a protocol associated with that layer, processed data for passing to a next layer in the hierarchy. For example, trace monitoring is the technique of collecting real time data from a data processing apparatus indicative of the activities of the data processing apparatus and generating a trace stream indicative of that activity for passing to a trace analysis apparatus. An example of this type of trace monitoring is the Embedded Trace Macrocell (ETM) architecture provided by ARM Limited. This architecture provides an ETM unit embedded on-chip to monitor the activity of a processor core. Here, the processor core and ETM unit can be considered to be a hierarchy of two layers, in which the processor core processes data and passes some processed data to the ETM unit, the format of that processed data being according to a particular protocol that will be recognized by the ETM unit, and secondly the ETM unit can be considered to be a data processing layer configured to receive the data from the processor core and to generate the trace stream according to a protocol that will be recognized by the trace analysis apparatus.

In an arrangement such as an ETM unit connected to a processor core, it is known, in order for the bandwidth of data generated by the ETM unit (its processed data) to be used as efficiently as possible, that the meaning of particular data generated by the ETM unit will vary, depending on the context. Hence, the ETM unit is configured to generate additional synchronization information which provides semantic information allowing the processed data, i.e. the trace stream, to be correctly interpreted.

Typically, in the example of a processor core and an ETM unit, the trace stream generated by the ETM unit is written to a buffer of finite size. More particularly, such a buffer is normally arranged in a circular fashion, such that the oldest data contained therein is overwritten by the newest arriving data. This has the consequence that additional synchronization information will only be temporarily available, before being overwritten in the circular buffer. Hence, depending on the size of the circular buffer, such synchronization information must be output sufficiently often to be available in the buffer before being overwritten.

Also, it is known for the transport mechanisms for such processed data to be lossy, i.e. not all the processed data that was originally sent is received at its intended destination. For example bit errors could occur, rendering some processed data unusable, or some data could overflow in an internal buffer that forms part of the transport mechanism. In such situations some important information, such as synchronization information, could be lost, requiring synchronization information to be re-issued so that correct interpretation of the processed data can be carried out.

It is also known for such operating systems as Linux to offer instrumentation tools such as LTTng and ftrace, which dump trace information indicative of processing activities to a file. Synchronization is however typically not a critical issue for such tools, as the file size is not particularly strictly limited.

In data processing apparatuses such as a processor core connected to an ETM unit, it is known therefore that the ETM unit must output its synchronization information sufficiently frequently for a limited size trace buffer to contain enough information to allow the trace information temporarily buffered therein to be interpreted. However, the use of synchronization information becomes more complex when more than one data processing layer in a hierarchy of layers generates its processed data in a fashion which requires intermittent synchronization information for its interpretation. For example, considering a processor core and a tracing unit, the communication path between the processor core and the tracing unit may be arranged as a number of distinct channels, a particular channel being allocated to a particular process executing on the processor core, such that (whilst it is allocated to that process) information received over that channel may be interpreted as having come from the associated process. The mapping of channels to processes is context dependent, i.e. will depend on what processing activities the processor core is currently performing. Hence it is necessary for the processor core to provide this information if it is to be correctly interpreted. In addition there remains the same above-discussed need for the tracing unit to output its own synchronization information.

There a various ways in which such synchronization information from the processor core could be provided. Firstly, the synchronization information could be generated when a new process is started. However, depending on the buffer size into which the trace stream will be written, this is likely to be too infrequent, for the process could continue executing beyond the time when its original synchronization information has been overwritten in the buffer. Secondly, synchronization information could be output every time a particular channel is used. However, this has the clear drawback that it could easily result in an enormous amount of synchronization data being output stealing valuable bandwidth from the processed data that is being monitored. Thirdly, the synchronization information could be output on the nth time a channel is used. The drawback of this approach is defining n, since a suitable value will depend on the buffer size and frequency with which the channel is used.

Commonly owned co-pending U.S. patent application Ser. No. 12/385,319, the entire contents of which are hereby incorporated by reference, discloses a technique for inserting synchronization information in a trace system, wherein the addition of synchronization information to trace data is dependent on some downstream data processing behaviour, for example on how full a downstream trace buffer is.

The article "Traces Synchronization in Distributed Networks" by Eric Clement and Michel Dagenais, Journal of Computer Systems, Networks, and Communications, Vol. 2009 (2009), Article ID 190579, (available at http://www.hindawi.com/journals/jcsnc/2009/190579.html) provides some background discussion to these issues.

However, when multiple data processing layers that can add synchronization information exist in a data processing apparatus, it would be desirable to provide an improved technique for providing the synchronization information associated with the processed data passed between those layers.

SUMMARY OF THE INVENTION

Viewed from a first aspect, the present invention provides a data processing apparatus said data processing apparatus comprising a hierarchy of layers, said hierarchy of layers comprising at least two data processing layers, each data processing layer configured to receive data, and to generate processed data for passing to a next lower layer in said hierarchy according to a protocol specific to that data processing layer, wherein each data processing layer comprises a synchronization control unit configured intermittently to output synchronization information related to said processed data, said synchronization information providing semantic information required to interpret said processed data, wherein said synchronization control unit is further configured to output said synchronization information in response to a synchronization request signal received from a lower layer in said hierarchy, and wherein at least one data processing layer is configured, when outputting said synchronization information, to issue said synchronization request signal to a higher layer in said hierarchy.

In a data processing apparatus comprising a hierarchy of layers, wherein a hierarchy of layers comprises at least two data processing layers, each data processing layer comprises a synchronization control unit configured to intermittently output synchronization information related to the processed data it is generating and passing to a next lower layer in hierarchy (i.e. to the adjacent layer of the hierarchy in the direction that data is being passed from layer to layer). The semantic information could take a number of forms, so long as it provides the recipient with sufficient information to interpret the processed data. According to the techniques of the present invention, each data processing layer is configured to output synchronization information in response to a synchronization request signal received from a lower layer in the hierarchy of layers. Furthermore, at least one data processing layer is configured, when outputting its synchronization information, to issue its synchronization request to a higher layer in the hierarchy of layers. Accordingly, not only is a lower layer in the hierarchy able to request synchronization information from a higher layer in the hierarchy (i.e. to a layer of the hierarchy which is in the opposite direction to that in which data is being passed from layer to layer), but also at least one of data processing layer when outputting its own synchronization information is arranged to issue a synchronization request signal to a higher layer in the hierarchy. In the situation where more than one data processing layer is thus configured this means that if the lowest data processing layer issues a synchronization request signal when outputting its own synchronization information, that synchronization request signal will be passed up through the hierarchy, each layer that receives it issuing its synchronization information. Hence when the lowest layer in the hierarchy outputs synchronization information, synchronization information associated with higher layers in the hierarchy can automatically be output, such that the processed data issued from the lowest layer of the hierarchy can be correctly interpreted. In particular, when the processed data generated by the lowest layer of the hierarchy is written to a buffer of limited size, the outputting of synchronization information by the lowest layer (which writes to that buffer) will ensure that synchronization information from higher layers is also output, and the limited information available in buffer can still be interpreted. Furthermore, the techniques of the present invention provide a mechanism for synchronization information in higher layers of the hierarchy only to be output when needed, this mechanism being dynamically adaptable, depending on the current activity of the data processing apparatus.

The data processing apparatus may comprise a processor core and a tracing unit, wherein said processor core is a first data processing layer and said tracing unit is a second data processing layer, said first data processing layer being higher in said hierarchy of layers than said second data processing layer, wherein said processor core generates activity information as said processed data indicative of activity of processes executing on said processor core and said tracing unit generates a trace stream as said processed data indicative of said activity information. The bandwidth available for a trace unit generating a trace stream indicative of the activity of processes executing a processor core will typically be very limited, for example due to a limited number of pins of the periphery of a chip via which the trace stream is output and/or the limited size of an on-chip trace buffer for accumulating that trace stream. Consequently, various techniques are likely to be employed to reduce the volume of information output by the tracing unit as far as possible. These techniques will typically require synchronization information to be output by the tracing unit such that the trace stream can be interpreted. The semantic information provided by this synchronization information from the tracing unit could take a number of forms, for example when the tracing unit is outputting addressing information, it could comprise a base address and the tracing unit could be configured to only include a difference relative to that base address. In addition, the tracing unit itself may require synchronization information from the processor core in order to interpret the process information indicative of activity of processes acting on the processor core. In turn, the semantic information provided by this synchronization information from the processor core could take a number of forms, for example it could comprise information indicative of which process is the origin of the activity information.

According to the techniques of the present invention, in this embodiment both the processor core and the tracing unit are configured to output their synchronization information in response to a synchronization request signal received from a lower layer in the hierarchy. Furthermore, the tracing unit is configured when outputting its synchronization information to issue a synchronization request signal to the processor core. Accordingly, when the trace unit synchronizes (i.e. outputs its synchronization information), this will also cause the processor core to output its own synchronization information. Hence at the lowest layer of the hierarchy of layers only a single synchronization request signal is required to trigger a full set of synchronization information to be output.

In some embodiments at least one data processing layer is further configured to add said synchronization information to said processed data in response to said synchronization request signal. Accordingly the synchronization information will then form a part of the processed data passed to the next lower layer in hierarchy, and is therefore associated with the processed data for which it is required for interpretation. In other embodiments at least one data processing layer is further configured to output said synchronization information separately from said processed data in response to said synchronization request signal. Accordingly, the synchronization information does not form part of the processed data. This may be advantageous if the bandwidth available for the processed data is desired to be utilized entirely for processed data, without sacrificing any of it to synchronization information.

In embodiments comprising a processor core and a tracing unit, the tracing unit may be configured to cause the trace stream to be written into a buffer. This provides a mechanism for smoothing a variable rate of production of a trace stream, such that it can be read at a more constant rate, and/or permitting the trace stream to be read further downstream in bursts. In some embodiments the buffer is a circular buffer. A circular buffer, i.e. one in which the oldest data is overwritten by the newest data, provides a suitable mechanism for storing trace stream information when space is at a premium, as is often the case in a tracing unit associated with a processor core.

In embodiments where the data processing apparatus comprises a processor core and a tracing unit, the processor core may be configured to pass said activity information to said tracing unit via at least one channel selected from a plurality of channels. The use of such channels provides a mechanism for categorizing the activity data, for example to indicate that a certain set of activity data is associated with a particular process executing on the processor core. These channels may take a number of forms, but in some embodiments said at least one channel is a memory mapped channel selected from a plurality of memory mapped channels. An arrangement of memory mapped channels provides a convenient mechanism for the processor core to pass information to the tracing unit, which furthermore allows a simple categorization of the information, for example such that selected channels can pass particular types of information.

In embodiments using such channels, the data processing apparatus may be configured to store mapping information indicative of at least one process and at least one said channel allocated thereto. By storing mapping information in this manner, the data processing apparatus may keep a record of an allocation of channels to processes for reference purposes, in particular for reference when outputting the mapping information as synchronization information. When this is the case, the processor core may be configured to output said mapping information as said synchronization information in response to said synchronization request signal received from said tracing unit. Hence, by receiving this mapping information, the tracing unit can generate a trace stream in which not only is there information indicative of processing activity within the processor core, but also synchronization information is provided allowing the end recipient to determine which process is responsible for which indicated activity. In some embodiments said processor core may be configured to output said mapping information via a predetermined channel indicator. Thus a predetermined channel may be defined, over which the processor core can pass mapping information to the tracing unit.

It will be appreciated that the synchronization request could take a number of forms, but in embodiments the synchronization request comprises an interrupt signal. This provides a convenient mechanism for the tracing unit to signal to the processor core that synchronization information from the processor core is requested. In other embodiments the synchronization request comprises a flag set by the tracing unit and intermittently polled by the processor core. This has the advantage that control over when to respond to the synchronization request is more under the control of the processor core, since the processor core will not receive an interrupt, but can poll the flag as appropriate to its current processing requirements. The flag might be set in a number of locations in the data processing apparatus, but in one embodiment said flag is set in a flag storage unit in said tracing unit.

In embodiments where the data processing apparatus is configured to store mapping information, the data processing apparatus may be further configured to store at least one flag in association with said mapping information, said flag selectively indicating that said mapping information should be included in said synchronization information. It may be the case that a relatively large quantity of mapping information is stored in the processing apparatus, for example, when a large number of channels have been allocated to many processes executing on the processor core. However, it may also be the case that some of those processes are only rarely used or are relatively unimportant, and thus that the synchronization information associated therewith is only rarely required. Hence, the flag associated with the mapping information may selectively indicate whether a given item of mapping information should be included in the synchronization information. For example, the flags might only be set for currently active processes on the processor core such that only synchronization information associated therewith will be output. In some such embodiments said data processing apparatus may be further configured to set said at least one said flag in response to said synchronization request signal. This provides a convenient mechanism for indicating which items of mapping information should be output when requested. For example, in response to the synchronization request signal the flags for all processes could be set or alternatively only those currently active processes could be set. Similarly, in some such embodiments said data processing apparatus may further configured to output said mapping information only if said processor core has passed said activity information to said tracing unit via said at least one channel since a last time said mapping information was output. Thus, issuing the mapping information when it is not required, because that channel has not been used since the last time that mapping information was output, can be avoided.

In some embodiments, at least one data processing layer is configured, when outputting said synchronization information, to include an indication of whether said synchronization information has not changed since said synchronization information was last output. Such an indication can be useful, for example when only a limited amount of processed data from that data processing layer is available, because otherwise processed data generated before the synchronization information was output could not be guaranteed to have been generated according to the semantic information comprised within that synchronization information. However, if an indication that the synchronization information has not changed since said synchronization information was last output is received, even processed information prior to the synchronization information can be correctly interpreted.

In some embodiments, at least one data processing layer is configured when outputting said synchronization information, to include an indication of whether a subset of said synchronization information has not changed since said synchronization information was last output. It may be the case that only a subset of the synchronization information is currently of interest, e.g. being actively monitored, so an indication that that subset has not changed may suffice.

In embodiments where a processor core is configured to output mapping information as the synchronization information in response to a synchronization request signal received from a tracing unit, the processor core may be configured, when outputting said mapping information, to include an indication of whether allocation of a specified channel has not changed since said mapping information was last output. If the allocation of a specified channel has changed, then the meaning of process information received via that channel will have changed, e.g. it may now be associated with a different process. In other such embodiments, the processor core may be configured, when outputting said mapping information, to include an indication of whether no mapping information has changed since said mapping information was last output. An indication that no mapping information has changed means that all processed information prior to said synchronization information may be interpreted in the same manner as processed information received after the synchronization information.

In some embodiments at least one data processing layer comprises a counter unit, said counter unit configured, on reaching a predetermined count, to trigger output of said synchronization information. This mechanism provides that the synchronization information will be output at regular intervals, in dependence on the predetermined count. Alternatively or in addition, at least one data processing layer comprises an external input, said external input configured to trigger output of said synchronization information. The provision of this external input means that the data processing layer may be caused to output the synchronization information either by a lower layer in the hierarchy or from another part of the data processing apparatus, perhaps directly requested by the user.

In some embodiments, said synchronization request signal is issued by said lower layer in said hierarchy in response to an identification that at least a portion of said processed data received by said next lower layer is absent. For example, this lower layer in the hierarchy could determine that at least a portion of the processed data has not been correctly received due to transport errors, or because an internal buffer has overflowed and that portion has been lost. In response to such a situation this lower layer can then issue the synchronization request, so that the necessary information for correctly interpreting the processed data, namely the synchronization information, is then output from the relevant data processing layer.

In some embodiments said lower layer in said hierarchy is said next lower layer in said hierarchy and thus the synchronization request signal is received from the next lower layer in the hierarchy. In some embodiments said higher layer in said hierarchy is a next higher layer in said hierarchy and thus the synchronization request signal is issued to the next higher layer in the hierarchy.

Viewed from a second aspect, the present invention provides a data processing apparatus, said data processing apparatus comprising: a hierarchy of layers, said hierarchy of layers comprising at least two data processing layer means, each data processing layer means for receiving data, and generating processed data for passing to a next lower layer in said hierarchy according to a protocol specific to that data processing layer means, wherein each data processing layer means comprises synchronization control means for intermittently outputting synchronization information related to said processed data, said synchronization information providing semantic information required to interpret said processed data, wherein said synchronization control means further comprises a means for outputting said synchronization information in response to a synchronization request signal received from a lower layer in said hierarchy, and wherein at least one data processing layer means is configured as a means for issuing, when outputting said synchronization information, said synchronization request signal to a higher layer in said hierarchy.

Viewed from a third aspect, the present invention provides a method of data processing in a data processing apparatus comprising a hierarchy of layers, said hierarchy of layers comprising at least two data processing layers, said method comprising the steps, performed in each data processing layer, of receiving data, generating processed data and passing said processed data to a next lower layer in said hierarchy according to a protocol specific to that data processing layer; intermittently outputting synchronization information related to said processed data, said synchronization information providing semantic information required to interpret said processed data; and outputting said synchronization information in response to a request signal received from a lower layer in said hierarchy, wherein at least one data processing layer, when outputting said synchronization information, issues said request signal to a higher layer in said hierarchy.

Viewed from a fourth aspect, the present invention provides a data processing apparatus, said data processing apparatus comprising: a hierarchy of layers, said hierarchy of layers comprising at least two data processing layers, each data processing layer configured to receive data, and to generate processed data for passing to a next lower layer in said hierarchy according to a protocol specific to that data processing layer, wherein each data processing layer comprises a synchronization control unit configured intermittently to output synchronization information related to said processed data, said synchronization information providing semantic information required to interpret said processed data, wherein at least one data processing layer is configured, when outputting said synchronization information, to include an indication of whether said synchronization information has not changed since said synchronization information was last output.

Viewed from a fifth aspect, the present invention provides a method of data processing in a data processing apparatus comprising a hierarchy of layers, said hierarchy of layers comprising at least two data processing layers, said method comprising the steps, performed in each data processing layer, of receiving data, generating processed data and passing said processed data to a next lower layer in said hierarchy according to a protocol specific to that data processing layer; intermittently outputting synchronization information related to said processed data, said synchronization information providing semantic information required to interpret said processed data; wherein at least one data processing layer, when outputting said synchronization information, includes an indication of whether said synchronization information has not changed since said synchronization information was last output.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
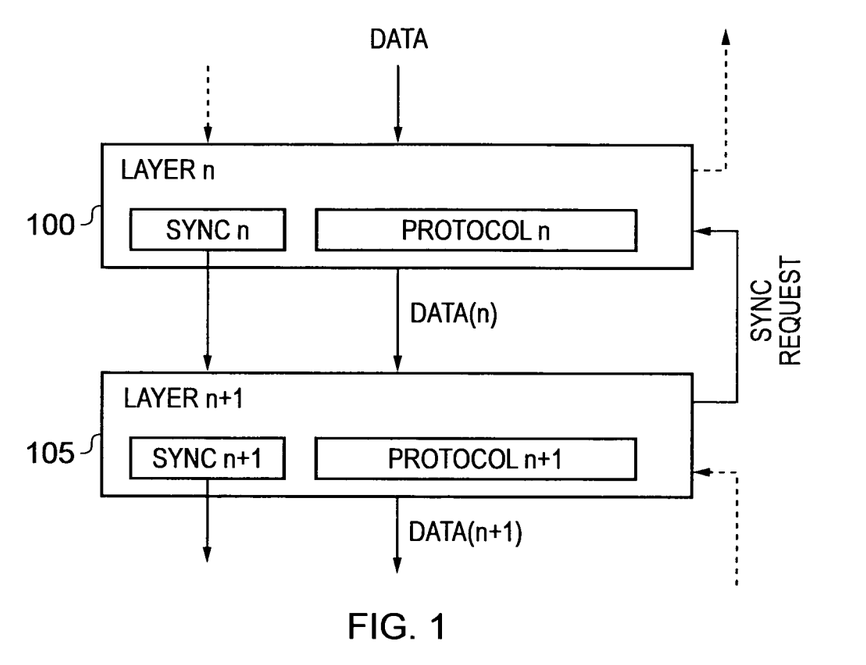
FIG. 1 schematically illustrates two data processing layers each configured to pass processed data to a next lower layer.

FIG. 1 schematically illustrates a data processing apparatus comprising a hierarchy of layers. Of these layers, only two are explicitly illustrated, namely data processing layer 100 and data processing layer 105. Each data processing layer is configured to receive data and to generate, according to a protocol specific to that data processing layer, processed data for passing to the next layer down in the hierarchy. Hence, data processing layer 100 receives data, processes it according to protocol n and passes the processed data(n) to the data processing layer 105. Data processing layer 105 receives data(n), processes it according to protocol n+1 and generates processed data(n+1) for passing to a next lower layer in the hierarchy. As illustrated, it can be seen that generically a data processing layer at layer n processes data and generates processed data(n) according to protocol n and passes that data(n) to a layer at layer n+1.

Each data processing layer is also configured to intermittently add synchronization information to the processed data. This synchronization information provides semantic information required to interpret the processed data generated according to the protocol of that layer. In some embodiments the synchronization information forms part of the processed data, or it may be transferred by a separate means. Data processing layer 105 is able to signal a synchronization request to data processing layer 100. Upon receipt of this synchronization request, data processing layer 100 is configured to output its synchronization information (sync n). Each of the data processing layers 100 and 105 is configured to output synchronization information intermittently. In some embodiments this can be with reference to timing information, for example synchronization information may be output at given time intervals, or in other embodiments this may be dependent on an aspect of the data processing going on within each data processing layer. For example, when new data is processed according to the protocol which will require new semantic information to interpret it, corresponding synchronization information is also output. Data processing layer 105 is configured when adding its synchronization information (sync n+1) to its processed data(n+1) to also issue its synchronization request signal to data processing layer 100. This means that when data processing layer 105 provides synchronization information the provision of synchronization information from data processing layer 100 is also triggered.

Data processing layer 105 may also issue its synchronization request to data processing layer 100 if it identifies that at least a portion of the processed data received from data processing layer 100 is absent. This absence could, in one example, result from a lossy transport mechanism between the layers, or in another example, result from the overflow of an internal buffer, wherein processed data that were correctly received are subsequently lost due to storage limitations. Importantly, this absence could include the loss of some previously received synchronization information, the loss of which could hinder, or even render impossible, the correct interpretation of the received processed data. By requesting synchronization information from data processing layer 105 in this situation, data processing layer 100 reduces the adverse impact of that absence.

As shown by the dashed arrows in FIG. 1, the synchronization request connection between the data processing layers may be only one in a series, the hierarchy of layers in principle having any number of layers within it and any given layer (e.g. at layer n+1) can be configured to be able to send a synchronization request signal to the layer above it (i.e. layer n). A series of layers configured in this way thus form a chain, both in terms of processed data passing down the chain and in terms of synchronization request signals passing up the chain.

Figure 2A:
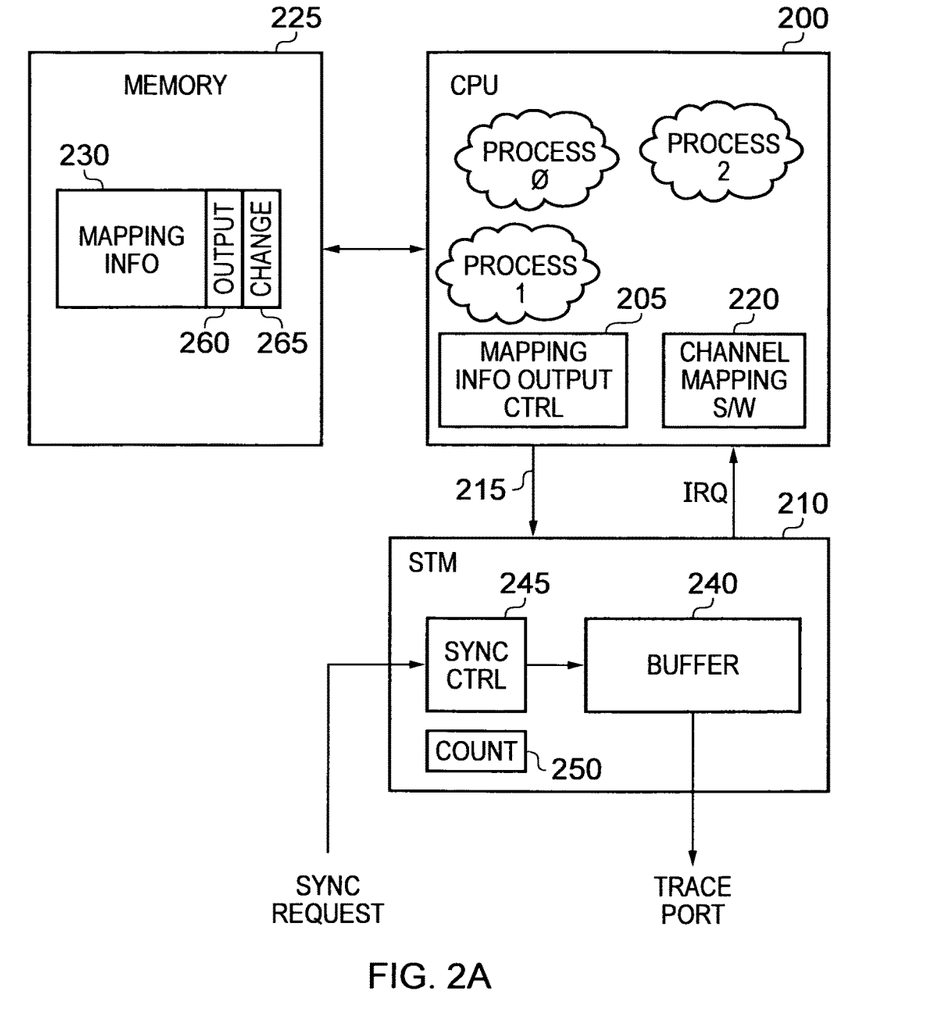
FIG. 2A schematically illustrates a data processing apparatus in one embodiment.

FIG. 2A schematically illustrates one embodiment of the present invention in which the hierarchy of layers comprises a processor core 200 connected to a tracing unit 210. In this embodiment the tracing unit 210 is a System Trace Macrocell (STM) provided by ARM Limited. In operation, the processor core (CPU) 200 executes various processes (process 0, process 1, process 2, etc), typically reading data values from, and writing data values to, memory 225 and provides the tracing unit 210 with activity information indicative of the activity of those processes. This information is passed to the tracing unit via path 215. In order to be able to provide information about a number of processes executing on the core, the processor core 200 is configured to associate different channels with each of the processes for which activity information is generated. This association of channels with processes is handled by channel mapping software 220 which also runs on the processor core. When a channel is allocated to a given process, this information is stored in memory 225 as mapping information 230. It should be noted that more than one channel may be allocated to a given process, depending on the instrumentation needs of that process. When a new process wishes to start an instrumentation stream, i.e. to output activity information over path 215 to tracing unit 210, the channel mapping software 220 allocates an available channel to that new process and records this information in mapping information 230. The mapping control unit 205 of processor core 200 then provides the tracing unit 210 with information about that process via its allocated channel. In other words the mapping control unit 205 acts as a synchronization control unit for the processor core 200. Conversely, when a process executing on the processor core terminates, the channels previously allocated to it become available for subsequent allocation to other processes.

Whilst the embodiment illustrated in FIG. 2A has been described above as being implemented using software executing on the processor core 200 to carry out the channel mapping (item 220) and using a hardware component to implement the mapping control unit (item 205), it should be understood that these are merely implementation choices for this particular embodiment and these components could be entirely software implemented, entirely hardware implemented, or implemented as any combination of hardware and software. Similarly the following description of tracing unit 210 should be understood to be able to be implemented either as pure software, or as pure hardware, or as a combination of the two.

The tracing unit 210 receives the activity information via path 215, each item of activity information being associated with a particular channel. The tracing unit 210 processes this information and generates a trace stream which is stored in buffer 240 before being output to a trace port. Tracing unit 210 is configured to generate the trace stream according to a predetermined protocol, which enables it to compress the activity information provided by processor core 200 into a limited amount of information. In addition it may only generate trace for a subset of the channels at a time. In order to allow a trace analyzing unit (not illustrated) downstream to analyze the trace stream thus generated, the tracing unit 210 is configured to add synchronization information to the trace stream under control of the synchronization control unit 245. Synchronization control unit 245 intermittently adds synchronization information to the trace stream with reference to a counter 250 which provides an indication at predetermined time intervals. The synchronization control unit 245 is also configured to respond to an external synchronization request to add synchronization information to the trace stream. Tracing unit 210 is also configured, when synchronization control unit 245 adds synchronization information to the trace stream stored in buffer 240 to send a synchronization request signal to processor core 200 by means of the interrupt signal IRQ. On receipt of the interrupt signal IRQ, the processor core 200 is configured to reference mapping information 230 in memory 225, and to output at least some of that mapping information as synchronization information over path 215. Mapping information 230 further comprises output flags 260 and change flags 265. Output flags 260 indicate whether a particular item of mapping information should be included in the synchronization information passed from processor core 200 to tracing unit 210. Change flags 265 indicate whether the mapping information 230 has changed since the last time it was output as synchronization information. The use of flags 260 and 265 will be further discussed below with reference to FIGS. 5 and 6. In particular, the mapping control unit 205 is configured to use a predetermined channel to pass the mapping information to the tracing unit 210.

Figure 2B:
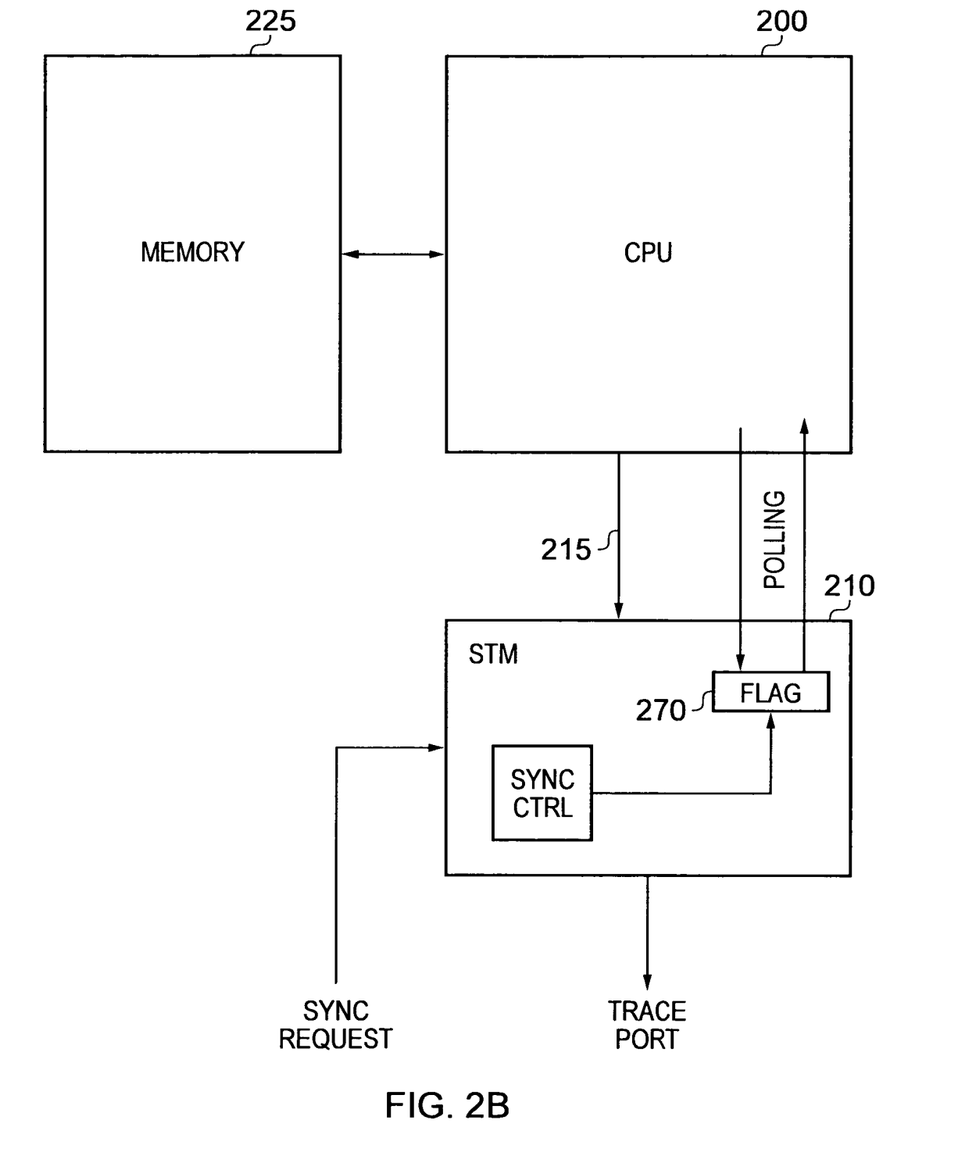
FIG. 2B schematically illustrates the embodiment illustrated in FIG. 2A, with an alternative synchronization request mechanism.

FIG. 2B schematically illustrates an embodiment which is essentially the same as that illustrated in FIG. 2A. The one difference is the mechanism by which the tracing unit 210 sends its synchronization request signal to processor core 200. In this embodiment this is not performed by means of the interrupt signal IRQ, but rather by trace control unit 210 setting a flag in flag storage unit 270. Processor core 200 intermittently polls this flag storage unit 270 to check the status of the flag. When the flag indicates that the tracing unit 210 has requested synchronization, the flag is cleared and processor core 200 references mapping information 230 in memory 225, and outputs at least some of that mapping information as synchronization information over path 215 (as described above with reference to FIG. 2A).

Figure 3:
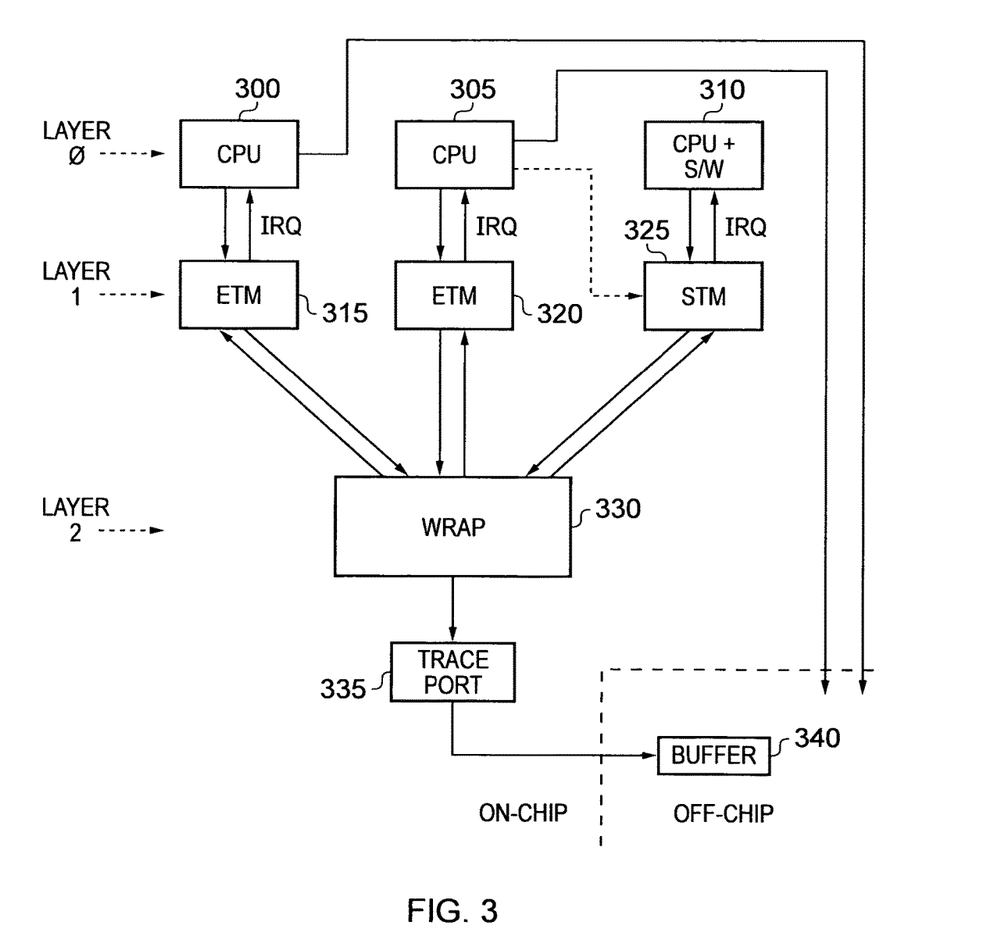
FIG. 3 schematically illustrates a data processing apparatus in one embodiment.

FIG. 3 schematically illustrates a data processing apparatus according to one embodiment. The data processing apparatus is partly arranged as a system-on-chip (SoC) device as well as comprising some off-chip components. The data processing apparatus comprises three processor cores 300, 305 and 310. Associated with each processor core is a tracing unit 315, 320 and 325 respectively. Tracing units 315 and 320 are Embedded Trace Macrocell (ETM) tracing units provided by ARM Limited. Each is closely connected to its respective processor core and monitors the activity within the processor core, for example having address and/or data comparators configured to identify when particular addresses and/or data items are used by the processor core. Tracing unit 325 is a STM unit such as that described with reference to FIG. 2A. STM unit 325 is connected to processor core 310 on which various software (s/w) processes execute which use instrumentation as described with reference to FIG. 2A to pass information indicative of their activity to STM unit 325. Each of the tracing units 315, 320 and 325 are configured to add synchronization information to the trace stream it generates in the manner described with reference to FIG. 2A. Similarly, each of the tracing units 315, 320 and 325 are configured, when adding their respective synchronization information to their respective trace stream, to send a synchronization request signal to their respective processor cores. As in the case of FIG. 2A, these are provided by interrupt signals IRQ. The trace streams generated by tracing units 315, 320 and 325 are passed to wrap unit 330 which combines these into a single trace stream which it passes via trace port 335 to the off-chip buffer 340. The wrap unit 330 also combines the three trace streams according to a protocol specific to the wrap unit, and is configured to intermittently add synchronization information to the trace stream it generates, which provides semantic information required to interpret the combined trace stream.

Hence, it can be seen that the processor cores 300, 305 and 310, the tracing units 315, 320 and 325, and the wrap unit 330 form a hierarchy of layers, namely layer 0, layer 1 and layer 2 respectively. Each of these layers is a data processing layer, configured to receive data and generate processed data for passing to the next lower layer in the hierarchy. Here, it will be understood that in layer 0 the data is received from components such as an external memory (not illustrated in this figure for clarity). Equally, it will be appreciated that the trace port 335 and the buffer 340 represent a lower layer in the hierarchy than the wrap unit 330 in layer 2.

In operation, when the wrap unit 330 issues a synchronization request signal to each of the trace units, this causes each tracing unit to output its own synchronization information. Similarly, each tracing unit is configured, when outputting its synchronization information, to issue a synchronization request signal to its own respective processor core, causing that processor core to output its own synchronization information.

Note that the processor cores 300, 305 and 310 in FIG. 3 may output their synchronization information in different ways. Processor core 300 and 305 have a separate path via which they can directly output synchronization information to an off-chip location (not explicitly illustrated). Processor core 310 is only configured to output its synchronization information to trace unit 325. In another embodiment, illustrated by the dashed arrow in FIG. 3, processor core 305 may issue its synchronization information to tracing unit 325, which is then configured to include this synchronization information in the trace stream it is generating and passing to wrapping unit 330.

Figure 4:
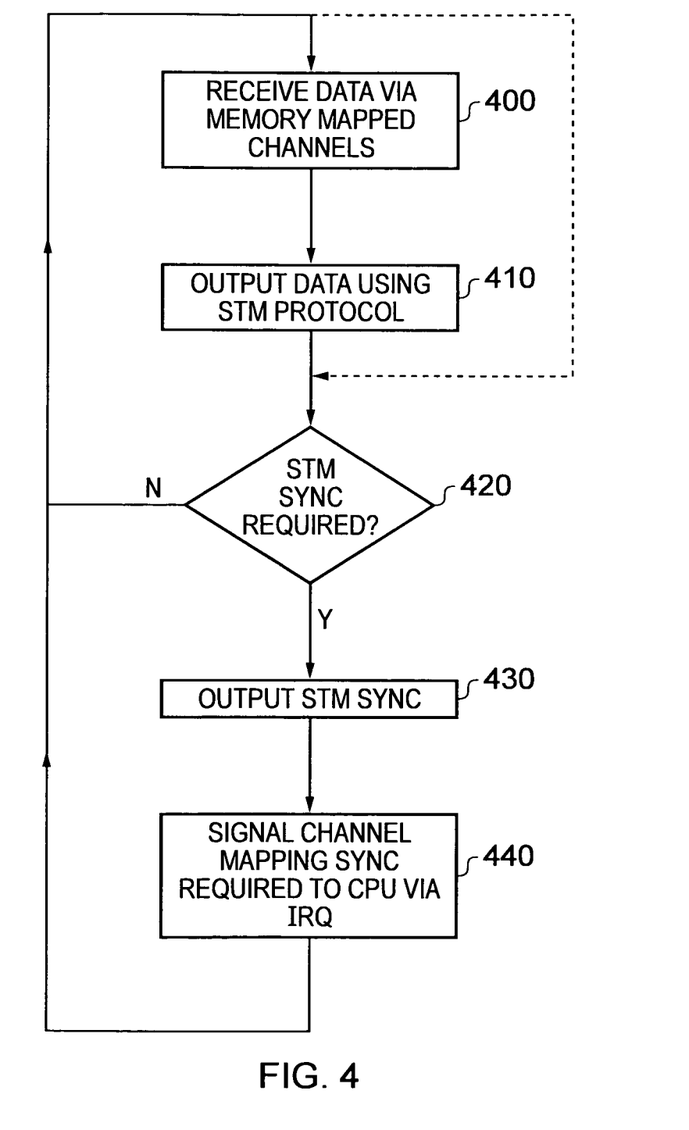
FIG. 4 schematically illustrates a series of steps taken in one embodiment.

FIG. 4 schematically illustrates a series of steps take in an STM tracing unit such as tracing unit 210 illustrated in FIG. 2A. At step 400 the STM receives data from the processor core via its memory mapped channels and at step 410 it outputs a stream of trace data according to a protocol specific to that STM unit. At step 420 it is checked if STM synchronization is required, i.e. if the predetermined timing interval indicated by counter unit 250 has elapsed, or if synchronization control unit 245 has received a synchronization request. If no synchronization is required the flow returns to step 400 and the STM unit continues receiving data and outputting (step 410) its trace stream. If however at step 420 synchronization is required, then at step 430 the STM unit outputs its synchronization information as part of the trace stream. At step 440 the STM unit signals to the processor core 200 that mapping synchronization is required (NB it should be noted that the ordering of steps 430 and 440 is not significant, and could be inverted from that illustrated). STM 210 signals this requirement via the interrupt request IRQ. In response to this processor core 200 will output the relevant mapping information (discussed below with reference to FIGS. 5, 6 and 7). The flow then returns to step 400 and the STM continues generating its trace stream in dependence on the data it receives over the memory mapped channels from the processor core 200. Note that the dashed arrow in FIG. 4 indicates that it is not strictly necessary for the flow to proceed via steps 400 and 410. In other words, the STM can be requested to output its current synchronization information (proceeding via steps 420, 430 and 440), without having to receive further data from the CPU and output it as a trace stream (steps 400 and 410).

Figure 5:
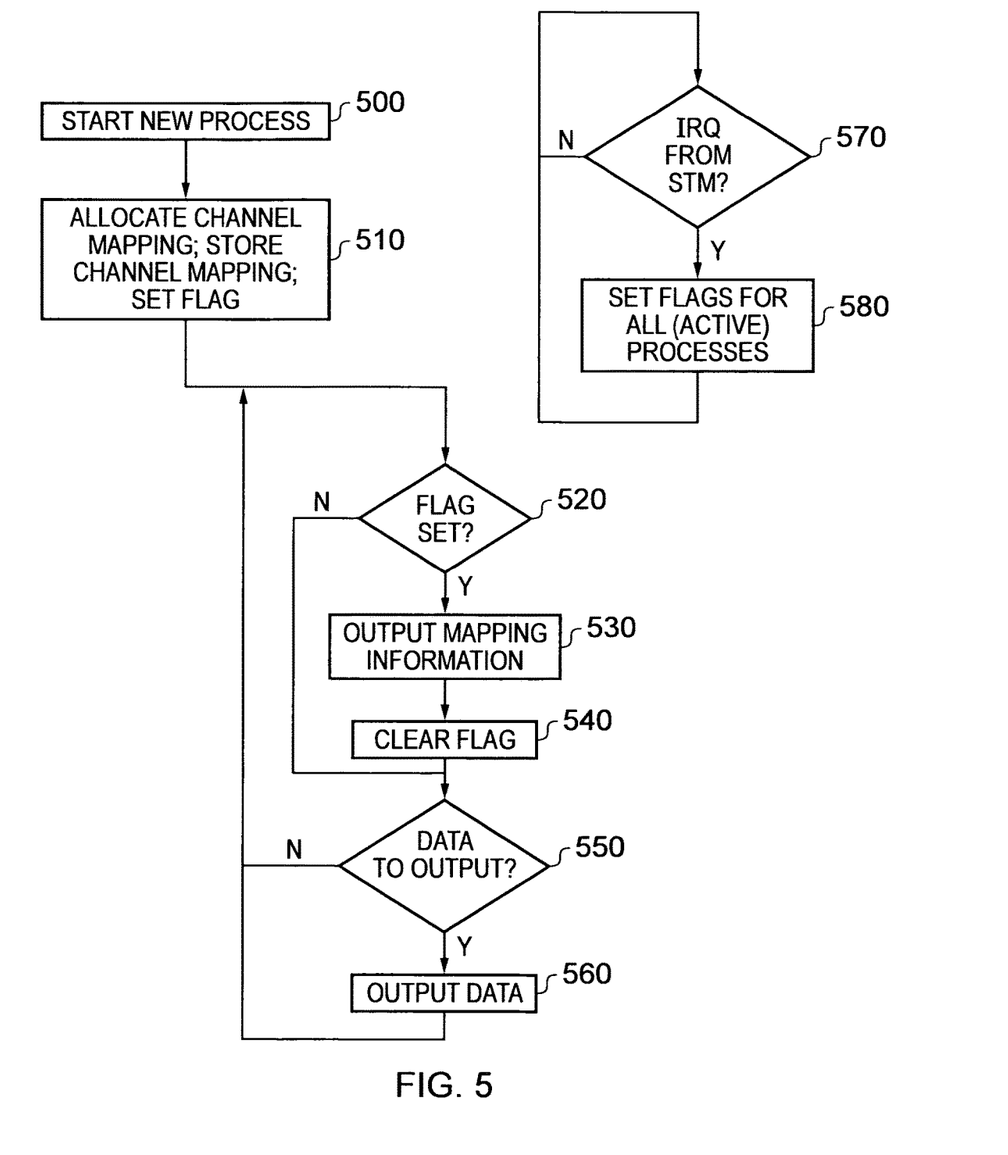
FIG. 5 schematically illustrates a series of steps taken in one embodiment.

FIG. 5 schematically illustrates a series of steps taken in a processor core such as processor core 200 illustrated in FIG. 2A. At step 500 the processor core 200 starts a new process. When it is required that this process is able to be traced, i.e. to pass activity information over path 215 to STM tracing unit 210, then at step 510, a channel mapping is allocated to this process. This may be a single channel or, for a more complex process, may be multiple channels. The channel mapping is stored in mapping information 230 in memory and an output flag 260 is set in association with this channel mapping, indicating that information about this mapping should be output at the next opportunity. The flow then proceeds to step 520 where it is checked if there is a corresponding output flag set in association with the channel mapping. If there is not then the flow proceeds directly to step 550. If however at step 520 it is determined that the relevant flag is set, then at step 530 the mapping information is output using the allocated channel for outputting mapping information. At step 540 the flag is cleared. Then at step 550 it is checked if there is data to be output. If no data is required to be output then the flow returns to step 520, checking for a set flag. If however at step 550 it is determined that data is to be output, then the flow proceeds to step 560 wherein that data is then output over the allocated channel(s). For each item of channel mapping information that is output, an indication is also output showing whether that channel mapping has changed since the last time that this mapping information was output. This will be described with reference to FIG. 7. The flow then returns to step 520. It should be noted that while the main loop of steps 520 to 560 is in progress, it is of course possible for a new process to be started (step 500) and have a channel mapping allocated (step 510).

Simultaneously to the above-described steps 500-560 being carried out, the processor core 200 also carries out separate steps 570 and 580. At step 570 it is continually checked if the IRQ signal has been received from the STM tracing unit 210. If it has not, the flow loops on itself at step 570. When the IRQ signal is received the flow proceeds to step 580, where the output flags 260 for all (active) processes are set. The choice of which output flags to set will depend on the particular needs of the set-up, in particular how much mapping information is required. All current mapping information could have the flags set, or alternatively only a sub-set could have the flags set, for example a sub-set allocated to currently active processes or a sub-set of the currently active channels. The setting of these flags will cause the corresponding mapping information to be output (as described above). The flow then returns to step 570.

Figure 6:
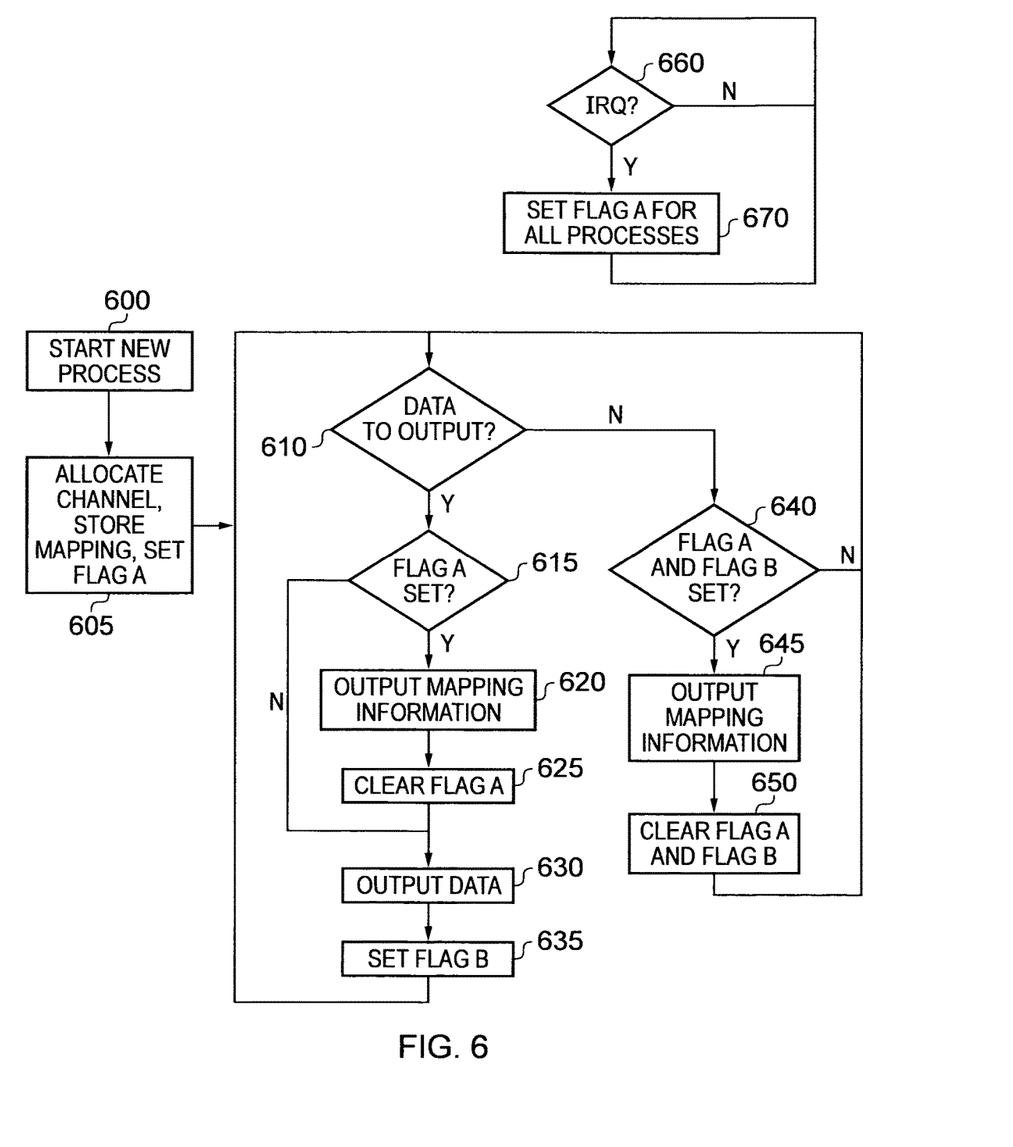
FIG. 6 schematically illustrates a series of steps taken in one embodiment.

FIG. 6 schematically illustrates a series of steps taken in a processor core such as processor core 200 illustrated in FIG. 2A, which are a variation on those illustrated in FIG. 5. In this example the flag discussed with reference to FIG. 5 is represented by flag A and a further flag (flag B) is introduced which provides a mechanism for labelling whether the associated channel has transmitted any data since the last synchronization request/response. Accordingly, synchronization data need only be output for those channels which have been active since the last synchronization data was output.

The sequence of steps illustrated in FIG. 6 proceeds as follows. Steps 600 and 605 are the same as steps 500 and 510 in FIG. 5, namely that at step 600 the processor core 200 starts a new process, and when it is required that this process is able to be traced, a channel mapping (or mappings) is allocated to this process. The channel mapping is stored in mapping information 230 in memory and an output flag 260 is set in association with this channel mapping, indicating that information about this mapping should be output at the next opportunity. The flow then proceeds to step 610 where it is determined if there is data to be output. If there is data to be output, then the flow proceeds to step 615, where the flag A for the corresponding channel is checked. If this flag is set, then at step 620 the corresponding mapping information is set and at step 625, flag A is cleared. The flow then proceeds to step 630 (to where the flow also proceeds from step 615 if flag A is not set), where the data is output. Finally flag B for the corresponding channel is set at step 635, indicating that this channel has output some data. The flow then returns to step 610.

If at step 610 it is determined that there is no data to be output, then the flow proceeds to step 640, where it is determined if both flags A and B are set. Both these flags being set indicates that a request for synchronization (mapping information) for the corresponding channel has been received (and is pending) and data has been output over that channel since the last time it was synchronized (i.e. that mapping information for that channel was output). If both flags A and B are set, then at step 645 the relevant mapping information is output and at step 650 both flags are cleared. The flow then returns to step 610. If it is determined at step 640 that either one or both of flags A and B are not set, then the flow directly returns to step 610.

As in FIG. 5 (see steps 570 and 580), in FIG. 6 the separate process of steps 660 and 670 is also followed at the same time as the main illustrated process. Steps 660 and 670 directly correspond to steps 570 and 580, with the exception that at step 670 it is flag A that is set, rather than the single flag of FIG. 5 set at step 580.

Figure 7:
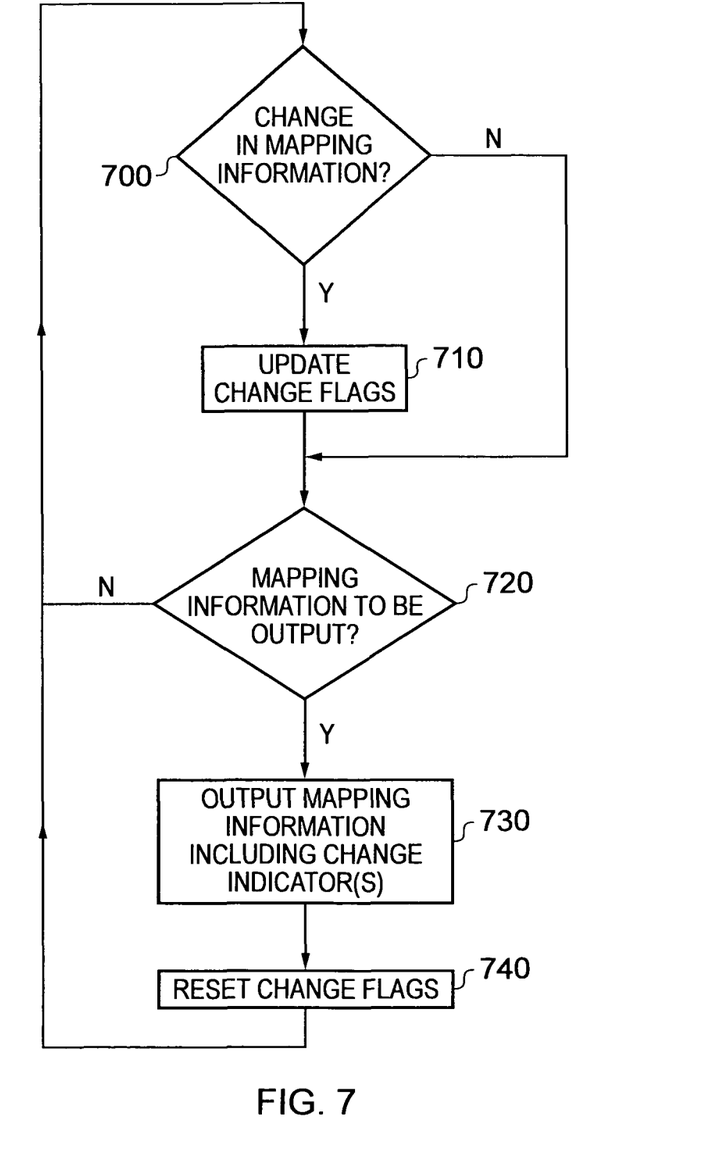
FIG. 7 schematically illustrates a series of steps taken in one embodiment.

FIG. 7 schematically illustrates in more detail the use of the change flags 265, and schematically illustrates a series of steps taken in one embodiment by a processor core such as that illustrated in FIG. 2A. At step 700, if any mapping information changes, then at step 710 the corresponding change flags 265 are updated. If there is no change in mapping information, the flow proceeds directly to step 720. At step 720, it is determined if there is mapping information to be output. If there is not, the flow returns to step 700. If there is mapping information to be output, then the flow proceeds to step 730, where the mapping information, including any relevant change indicators, is output. It should be noted that step 730 thus forms a subset of step 530 (see FIG. 5), i.e. when mapping information is output, it may further comprise a change indicator. Furthermore, it should be noted that the change indicator may be set up in a number of ways. It may simply be a flag indicating that no mapping information has changed since the last mapping information was output. The change indicator may, in more detail, indicate a subset of the mapping information that has not changed since the last mapping information was output. At the greatest level of detail, a given change indicator may indicate that a particular channel mapping has not changed since the last mapping information was output. Finally at step 740 the change flags are reset (cleared), indicating that the mapping information that has just been output is up-to-date. The flow then returns to step 700.

It should be noted that the series of steps illustrated in FIG. 7 may be taken by a processor core such that illustrated in FIG. 2A, whether the mapping (synchronization) information is output in response to a synchronization request received from the tracing unit or not. In other words, the processor core may issue synchronization information including an indication of whether the synchronization information has not changed since the synchronization information was last output, either as part of synchronization information issued due to an internal condition in the processor core or due to a request for synchronization information received from the tracing unit.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus, said data processing apparatus comprising:
   a hierarchy of layers,
   said hierarchy of layers comprising at least two data processing layers, each of the at least two data processing layers configured to receive data, and to generate processed data for passing to a next lower layer in said hierarchy according to a protocol specific to that data processing layer,
   wherein each of the at least two data processing layers comprises a synchronization control unit configured intermittently to output synchronization information related to said processed data, said synchronization information providing semantic information required to interpret said processed data,
   wherein said synchronization control unit for each of the at least two data processing layers is further configured to output its synchronization information in response to a synchronization request signal received from a respective lower layer in said hierarchy, and
   wherein at least one of the at least two data processing layers is configured, when outputting its synchronization information, to issue its synchronization request signal to a higher layer in said hierarchy.

2. A data processing apparatus as claimed in claim 1, wherein said data processing apparatus comprises a processor core and a tracing unit, wherein said processor core is a first data processing layer and said tracing unit is a second data processing layer, said first data processing layer being higher in said hierarchy of layers than said second data processing layer,
   wherein said processor core generates activity information as said processed data indicative of activity of processes executing on said processor core and said tracing unit generates a trace stream of said processed data.

3. A data processing apparatus as claimed in claim 1, wherein at least one of the at least two data processing layers is further configured to add its synchronization information to its processed data in response to the synchronization request signal received from the respective lower layer in said hierarchy.

4. A data processing apparatus as claimed in claim 1, wherein at least one of the at least two data processing layers is further configured to output its synchronization information separately from its processed data in response to the synchronization request signal received from the respective lower layer in said hierarchy.

5. A data processing apparatus as claimed in claim 2, wherein said tracing unit is configured to cause said trace stream to be written into a buffer.

6. A data processing apparatus as claimed in claim 5, wherein said buffer is a circular buffer.

7. A data processing apparatus as claimed in claim 2, wherein said processor core is configured to pass said activity information to said tracing unit via at least one channel selected from a plurality of channels.

8. A data processing apparatus as claimed in claim 7, wherein said at least one channel is a memory mapped channel selected from a plurality of memory mapped channels.

9. A data processing apparatus as claimed in claim 1, wherein said synchronization request signal received from the respective lower layer in said hierarchy comprises an interrupt signal.

10. A data processing apparatus as claimed in claim 1, wherein at least one of the at least two data processing layers is configured, when outputting its synchronization information, to include an indication that its synchronization information has not changed since its synchronization information was last output.

11. A data processing apparatus as claimed in claim 1, wherein at least one of the at least two data processing layers is configured, when outputting its synchronization information, to include an indication that a subset of its synchronization information has not changed since its synchronization information was last output.

12. A data processing apparatus as claimed in claim 1, wherein at least one of the at least two data processing layers comprises a counter unit, said counter unit configured, on reaching a predetermined count, to trigger output of its synchronization information.

13. A data processing apparatus as claimed in claim 1, wherein at least one of the at least two data processing layers comprises an external input, said external input configured to trigger output of its synchronization information.

14. A data processing apparatus as claimed in claim 1, wherein the synchronization request signal received from the respective lower layer in said hierarchy is issued in response to an identification that at least a portion of its processed data received by said respective lower layer in said hierarchy is absent.

15. A data processing apparatus as claimed in claim 1, wherein said respective lower layer in said hierarchy is said next lower layer in said hierarchy.

16. A data processing apparatus as claimed in claim 1, wherein said higher layer in said hierarchy is a next higher layer in said hierarchy.

17. A data processing apparatus, said data processing apparatus comprising:
   a hierarchy of layers,
   said hierarchy of layers comprising at least two data processing layer means, each of the at least two data processing layer means for receiving data, and generating processed data for passing to a next lower layer means in said hierarchy according to a protocol specific to that data processing layer means,
   wherein each of the at least two data processing layer means comprises synchronization control means for intermittently outputting synchronization information related to said processed data, said synchronization information providing semantic information required to interpret said processed data, wherein said synchronization control means for each of the at least two data processing layer further comprises a means for outputting its synchronization information in response to a synchronization request signal received from a respective lower layer means in said hierarchy, and wherein at least one of the at least two data processing layer means is configured as a means for issuing, when outputting its synchronization information, its synchronization request signal to a higher layer means in said hierarchy.

\* \* \* \* \*